CONTACT FOR SEMICONDUCTOR DEVICES

Filed July 16, 1949

INVENTOR
Harold B. Law
BY H. C. Newton
ATTORNEY

Patented Apr. 7, 1953 2,634,322

UNITED STATES PATENT OFFICE 2,634,322

CONTACT FOR SEMICONDUCTOR DEVICES

Harold B. Law, Princeton, N. J., assignor to Radio Corporation of America, a corporation of Delaware Application July 16, 1949, Serial No. 105,253

21 Claims. (Cl. 175—366)

This invention relates generally to multi-electrode semi-conductor devices and particularly to high-resistance contact electrodes for such devices as well as to a method of providing such electrodes on a semi-conducting crystal.

The three-electrode semi-conductor has recently been developed as an amplifier or oscillator. This device, which has been termed a "transistor," has been disclosed in a series of three letters to the Physical Review by Bardeen and Brattain, Brattain and Bardeen, and Shockley and Pearson which appear on pages 230 to 233 of the July 15, 1948, issue. The new amplifier includes a block of a semi-conducting material such as silicon or germanium which is provided with two closely adjacent point electrodes called "emitter" and "collector" electrodes in contact with one surface region of the material, and a "base" electrode which provides a large-area, low-resistance contact with another surface region of the semi-conducting material. This amplifier provides voltage as well as current gain under proper conditions and may be considered as a three-terminal network having a common input and output terminal. Thus, the device is effectively a four-terminal network having a common input and output electrode which may, for example, be the base electrode.

The emitter and collector electrodes of a semi-conductor amplifier normally are point contacts which may consist of thin wires. These two point electrodes must be very closely spaced to provide sufficient amplification and they usually have a distance of approximately two mils. In view of their extremely close spacing the positioning of the point electrodes presents considerable difficulties. Furthermore, a certain portion of the noise developed in the amplifier is due to variations of the contact pressure. It is accordingly desirable to provide electrodes which are not subject to noise caused by variations of the contact pressure. It has been found that the emitter and collector electrodes need not consist of point contacts but may have a somewhat larger contact area with the semi-conducting material provided the contact resistance of the emitter and collector electrodes is high compared to that of the base electrode at the operating conditions of the device. Furthermore, the emitter and collector electrodes must function as rectifying contacts while the base electrode should be a non-rectifying contact.

It is an object of the present invention, therefore, to provide a semi-conducting device having an improved high-resistance or rectifying contact electrode.

A further object of the invention is to provide a semi-conducting device having two extended line contacts spaced from each other and forming high-resistance electrodes on the semi-conducting body of the device and suitable as emitter and collector electrodes.

Another object of the invention is to provide a method of forming on a surface of a semi-conducting crystal elongated high-resistance electrodes.

In accordance with the present invention, a semi-conducting material such as a crystal of selenium or germanium is provided with a thin layer of conducting material which may consist of a metal evaporated onto a surface of the crystal. Such a metallic layer will have an intimate electric contact with the crystal. Preferably, two such metallic layers are provided with a uniform spacing therebetween which preferably does not exceed five mils. Each electrode may be of rectangular shape or may be triangular, or alternatively, both electrodes may cover substantially the entire surface of the crystal with the exception of the space between the electrodes.

These evaporated metallic electrodes are connected to contact elements which may consist of wires. Alternatively, the evaporated metallic electrodes may extend to respective conductors to provide a contact therewith. Finally, it is feasible to provide a single layer of evaporated metal provided with two contact elements such as wires, one having a blunt tip while the other has a sharp tip. The sharp tip will penetrate the evaporated layer and will make contact with the crystal and may be used as the emitter electrode while the other wire contacting the evaporated metallic layer serves as the collector electrode.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing in which:

Figures 1, 2, 3, 4, 5, 6, 7, 8, 9, 10, 11, 12, 13, 14, 15, 16:
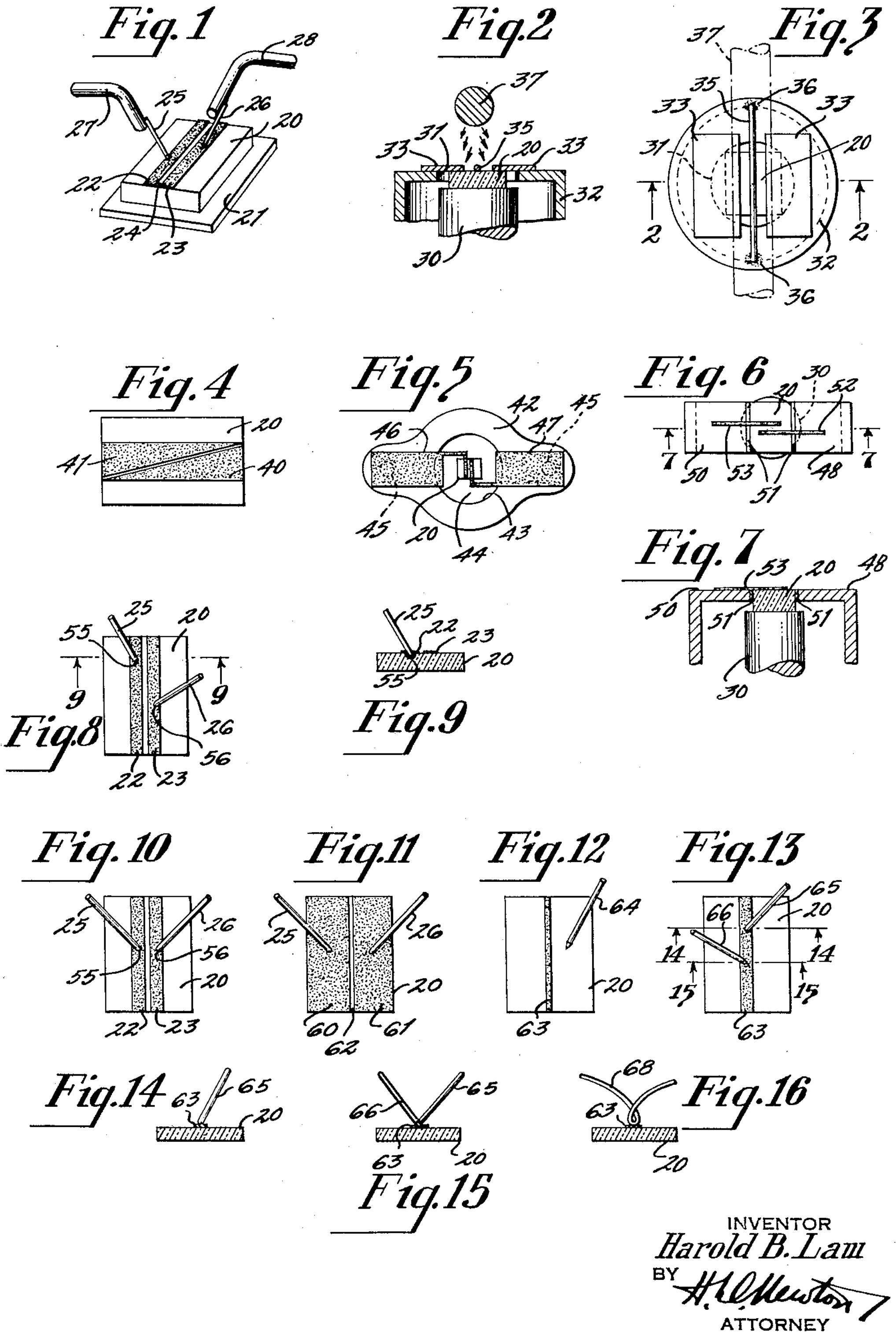
Figure 1 is a view in perspective of a three-electrode semi-conductor device embodying the present invention.
Figure 2 is a sectional view taken on line 2—2 of Figure 3 and illustrating a semi-conducting crystal and its mask for evaporating a metal onto a predetermined portion of the crystal.
Figure 3 is a top plan view of the arrangement of Figure 2.
Figure 4 is a plan view of a crystal having two evaporated triangular electrodes.
Figure 5 is a plan view illustrating a crystal and its support and two conductors electrically connected to the line contacts of the crystal through an evaporated layer.
Figure 6 is a plan view of a modification of the arrangement of Figure 5 where the conductors are insulated from the crystal through spacers.
Figure 7 is a sectional view taken on line 7—7 of Figure 6.
Figure 8 is a plan view of a crystal bearing two line contacts each being provided with a shallow depression for receiving a thin contact wire.
Figure 9 is a sectional view taken on line 9—9 of Figure 8.
Figure 10 is a plan view of a crystal having two line contacts provided with adjacent shallow depressions for receiving contact wires.
Figure 11 is a plan view of a crystal bearing two evaporated metal contacts extending across the entire top surface of the crystal with the exception of an insulating spacing therebetween.
Figure 12 is a plan view of a crystal provided with a line contact and a point contact.
Figure 13 is a plan view of a crystal provided with a single line contact having a wire with a blunt tip and a wire with a sharp tip.

Figures 14 and 15 are sectional views taken respectively on lines 14—14 and 15—15 of Figure 13; and Figure 16 is a sectional view of a crystal bearing an evaporated metallic layer and a modified contact element consisting of a wire having a loop.

Referring now to the drawing in which like components have been designated by the same reference numerals throughout the figures, and particularly to Figure 1, there is illustrated a semi-conductor device embodying the present invention which may be used as an amplifier, oscillator or the like. The device comprises a block 20 of semi-conducting material consisting, for example, essentially of an element having semi-conducting properties such as germanium, silicon, boron, tellurium, or selenium containing a small but sufficient number of atomic impurity centers or lattice imperfections as commonly employed for best results in crystal rectifiers. Germanium is the preferred material for block 20 and may be prepared so as to be an electronic N type semi-conductor crystal as is well known. The top surface of semi-conducting block 20 may be polished and etched in the manner explained in the paper by Bardeen and Brattain referred to. It is also feasible to utilize the germanium block from a commercial high-back voltage germanium rectifier such as a type 1N34.

As illustrated in Figure 1, block 20 may have a rectangular top surface although the crystal may also have a square surface. Block 20 is secured to metallic support 21 which serves as a base electrode having a relatively low contact resistance with block 20. Base electrode 21 may be formed by soldering or sweating a metallic member which may consist of brass, to block 20. In accordance with the present invention, block 20 is provided with two conducting layers 22 and 23 which may be of rectangular shape as shown in Figure 1. The spacing 24 between adjacent edges of conductive layers 22 and 23 should be uniform and should not exceed 5 mils and may be as small as 1 mil. The width of each conductive layer 22 or 23 may be of the order of spacing 24 and preferably layers 22 and 23 have a width of a few mils. Contact elements 25 and 26 are provided for contacting layers 22 and 23 respectively. Each contact element may consist of a thin wire which may have a diameter of one mil. The wires preferably are welded or otherwise secured to comparatively thick wires 27 and 28 which may consist of nickel or any other metal that may easily be bent.

Conductive layers 22 and 23 preferably consist of a metal and may be applied to block 20 by evaporating a metal onto the crystal surface. To this end the device of Figures 2 and 3 may be used with advantage. Crystal 20 is supported by stud 30 which may consist of brass. Block 20 is located in aperture 31 of a suitable cup 32 which may, for example, consist of nickel. Aperture 31 should be of such a size as to accommodate block 20 and may have a diameter of 75 mils. Two sheets of metal 33, 33 are welded to cup 32 to form a suitable slot or gap through which a portion of the surface of crystal 20 is exposed. A wire 35 which preferably has a diameter of approximately one mil is stretched across the slot formed by sheets 33 and is secured to cup 32 by silver paste as indicated at 36 in Figure 3.

The mask formed by wire 35 and metal sheets 33, 33 exposes two substantially rectangular areas of the surface of crystal 20. A comparatively heavy wire 37 which may have a diameter of 20 mils is placed parallel to the slot formed between wire 35 and metal sheets 33. This wire may be arranged approximately three inches from the slot.

Crystal 20 may be prepared as follows. The crystal surface is first etched in accordance with conventional practice as described in the literature. Now the crystal is placed in the mask shown in Figures 2 and 3. Wire 37 may then be coated with the metal to be evaporated. Thereafter, the crystal is heated in vacuo to a temperature of less than 200 degrees centigrade and preferably to approximately 100 degrees centigrade in order to outgas the crystal. This will increase the adherence of an evaporated metal to the crystal. If the crystal is heated to temperatures above 200 degrees centigrade a device is obtained which has no gain. This is believed to be due to the fact that the heat treatment destroys the surface layer which is formed through the etching process.

The thus treated and outgased crystal is then cooled to room temperature in vacuo. When wire 37 is now heated the metal evaporates and sharp shadows are cast by the mask because the effective width of the source of evaporation, that is, the width of wire 37 is approximately 20 mils.

It is feasible to obtain evaporated metal layers consisting of platinum, aluminum, or antimony. The evaporated metal forms a thin coherent layer in intimate electric contact with body 20. The contact is a rectifying contact having a comparatively high resistance compared to that of base electrode 21.

Depending on the shape of the mask and of the opening provided thereby the evaporated layer may assume various forms. Thus, Figure 4 illustrates a crystal 20 provided with two electrodes, 40 and 21, of triangular shape. The two electrodes have a uniform spacing therebetween of the order of one mil.

Electrical contact may be made to the evaporated contacts in various ways. Thus, the contact elements may consist of thin wires as shown in Figure 1. An alternative construction is illustrated in Figure 5. Crystal 20 is supported by support 42 which may, for example, consist of glass having a suitable central aperture 43. Crystal 20 is secured to support 42 by an insulating cement 44. Two conductors 45, 45 which may consist of heavy wires are imbedded in support 42. The entire surface of the device including crystal 20, conductors 45, support 42 and cement 44 is ground flat. Two evaporated layers 46 and 47 extend across the flat surface crystal 20 with a parallel spacing therebetween as shown. Each evaporated layer 46, 47 further extends across one of the conductors 45 to provide an electric contact therewith.

A modification of the device of Figure 5 is illustrated in Figures 6 and 7. Crystal 20 is supported by metallic stud 30. Two conductors 48 and 50 are arranged on opposite sides of the crystal and spaced therefrom by suitable insulating spacers 51, 51 which may consist of sheets of mica. The top surface of the device including crystal 20, spacers 51 and conductors 48, 50 is again ground flat and two evaporated lines 52 and 53 are provided parallel to each other across the crystal. Evaporated layer 52 extends across conductor 48 while layer 53 extends across conductor 50 to provide electric contact therewith.

If the contact elements for the electrodes consist of wires as shown in Figure 1 it has been found that the wires easily slip across the surface of the crystal thereby breaking or dislodging the evaporated electrodes. This disadvantage may be overcome as shown in Figures 8 and 9 by providing two shallow depressions 55 and 56 on the face of crystal 20. Each of the evaporated lines 22 and 23 extends across the surface of one of the depressions 55 and 56 respectively. The two contact elements such as wires 25, 26 preferably have a blunt and smooth tip. Each wire 25 and 26 is located in one of the depressions 55 or 56 to contact one of the electrodes. This will prevent the contact elements from moving laterally across the crystal surface as the contact pressure is increased.

Preferably, the two depressions 55 and 56 are spaced a considerable distance apart as shown in Figure 8 to facilitate positioning of the contact elements. However, it is also feasible as shown in Figure 10 to provide the two depressions 55 and 56 close together. In this case, metallic layers 22 and 23 may be omitted because the contact elements may serve as electrodes if they are spaced sufficiently close, that is, if their distance is approximately 2 mils or less.

It is also feasible to evaporate metal films 60 and 61 on a crystal 20 which extend across the entire surface of the crystal except for a strip 62 which insulates the two electrodes from each other. The spacing 62 may, for example, be 2 mils wide. Wires 25 and 26 which preferably consist of tungsten may be provided to effect electric contact with the electrodes. The device of Figure 11 may be used as an amplifier with normal gain. However, the collector current is comparatively high as may be expected. This is probably due to the fact that the contact resistance of electrodes 60 and 61 is somewhat lower than that of point electrodes but is still higher than the contact resistance of a base electrode such as electrode 21 (Figure 1).

As shown in Figure 12, an amplifier with fairly good operation may be obtained if one electrode consists of an evaporated metal layer 63 while the other electrode consists of a wire 64 or other conductor providing a point contact. Wire 64 should form the emitter electrode while evaporated layer 63 should be used as collector electrode. The distance between electrodes 63 and 64 should be approximately 2 mils or less.

Figures 13 to 15 illustrate a semi-conductor device consisting of a crystal 20 having a single evaporated line 63 provided thereon. Contact element 65 may consist of a wire and has a blunt point (as clearly shown in Figure 14) which contacts layer 63. Another contact element 66 may also consist of a wire and has a sharp tip as illustrated in Figure 15. The sharp tip will penetrate layer 63 and will therefore provide a point contact with crystal 20. It is believed that during operation of the device a very small portion of layer 63 will be removed by the action of heat so that actually contact element 66 will be insulated from metallic layer 63. However, it has not been possible to observe this insulating gap between wire 66 and layer 63 even under a microscope. Contact element 65 and layer 63 should form the collector electrode while contact element 66 should form the point-like emitter electrode.

The sharp tip required for contact element 66 may be made, for example, by heating a tungsten wire in an oxidizing flame as disclosed and claimed in the copending application to George M. Rose, Jr., filed on April 30, 1949, Serial No. 90,702, entitled "Semi-Conductor Amplifier Construction," now matured into Patent 2,538,593, and assigned to the assignee of this application. The conical tip of the tungsten wire is obtained in view of the temperature gradient along the length of the wire. The temperature of the wire determines the amount of tungsten that oxidizes and voltolizes. The blunt point required for contact element 65 may be obtained by cutting off a comparatively thick wire which may have a diameter of 5 mils. The tip of the wire may then be ground to round off corners and to obtain approximately a hemispherical tip.

As shown in Figure 16, contact may be also made to layer 63 on crystal 20 by means of a wire 68 having a loop contacting layer 63. Wire 68 may have a diameter of 2.5 mils.

The spacing between electrodes 63 and 66 (Figures 13 to 15) is smaller than can be obtained with other known methods. This will contribute to a high frequency response of the device illustrated in Figures 13 to 15. It should also be pointed out that not only the shape of the tip but also the contact pressure is important in determining whether the contact element will penetrate the metallic layer 63. In other words, an increase of the contact pressure may cause the contact element to break through the metallic layer 63 and to contact the surface of the crystal.

There has thus been disclosed a semi-conductor device having improved high-resistance or rectifying contacts. This contact may consist of a thin layer of a conducting material such as a metal which is preferably applied by evaporating the metal onto the crystal. Contact may be made with the thus obtained electrode by a wire or by extending the conductive layer to another conductor such as a wire. Furthermore, the electrodes may consist of a conductive layer and of a pointed wire which penetrates the layer to provide an emitter electrode, the layer serving as the collector electrode.

What is claimed is:

1. The method of providing a high resistance contact for a germanium crystal, said method comprising preparing a surface of said crystal by etching it, heating said crystal to a temperature of approximately 100 degrees and less than 200 degrees centigrade in vacuo, and thereafter evaporating a metal selected from the group consisting of platinum, aluminum and antimony onto a portion of said surface.

2. The method of providing a high resistance contact for a germanium crystal, said method comprising preparing a surface of said crystal by etching it, heating said crystal to a temperature of approximately 100 degrees and less than 200 degrees centigrade in vacuo, allowing said crystal to cool, and thereafter evaporating a metal selected from the group consisting of platinum, aluminum and antimony onto a predetermined portion of said surface.

3. A semi-conducting device comprising a semi-conducting body, and three electrodes in contact with said body, a first one of said electrodes providing a relatively low-resistance contact with said body, a second and a third one of said electrodes consisting each of a conducting layer of evaporated metal on said body providing a relatively high-resistance rectifying contact with said body, said second and third electrodes having edges substantially uniformly spaced from each other so that said second and third electrodes are not in direct electrical contact with each other.

4. A semi-conducting device comprising a semi-conducting body, and three electrodes in contact with said body, a first one of said electrodes providing a relatively low-resistance contact with said body, a second and a third one of said electrodes consisting each of an evaporated conducting layer on said body providing a relatively high-resistance contact with said body, said second and third electrodes having adjacent edges substantially uniformly spaced from each other by a distance of no more than five mils.

5. A semi-conducting device comprising a semi-conducting body, and three electrodes in contact with said body, a first one of said electrodes providing a relatively low-resistance contact with said body, a second and a third one of said electrodes consisting each of an evaporated metal layer on said body providing a relatively high-resistance contact with said body, said second and third electrodes having adjacent edges substantially parallel to each other and having a substantially uniform spacing from each other not exceeding five mils.

6. A semi-conductor device comprising a semi-conducting body having a first and a second surface, a pair of electrodes, each consisting of a thin coherent layer of evaporated metal intimately contacting said first surface to provide rectifying contacts therewith and being closely spaced from each other, and a further electrode in low-resistance contact with said second surface.

7. A semi-conducting device comprising a semi-conducting body having a first and a second surface, a pair of electrodes, each consisting of a thin coherent layer of evaporated metal in electrical contact with said first surface and extending substantially across the entire length of said body, said electrodes being spaced from each other by a distance not exceeding 5 mils, and a further electrode in low-resistance contact with said second surface.

8. A semi-conducting device comprising a semi-conducting body having a surface, a pair of electrodes, each consisting of a thin coherent layer of evaporated metal in electrical contact with said surface and extending substantially across the entire length of said body, said electrodes being spaced from each other by a distance not exceeding 5 mils, the width of each electrode being of the order of the spacing therebetween, and a further electrode in low-resistance contact with said body.

9. A semi-conducting device comprising a semi-conducting body having a surface, a pair of electrodes, each consisting of a thin coherent layer of evaporated metal in electrical contact with said surface and extending substantially across the entire length of said body, each of said electrodes having a substantially rectangular shape, said electrodes being parallel to each other and spaced from each other by a distance not exceeding 5 mils, the width of each electrode being of the order of the spacing therebetween, and a further electrode in low-resistance contact with said body.

10. A semi-conducting device comprising a semi-conducting body having a surface, a pair of electrodes, each consisting of a thin coherent layer of evaporated metal in electrical contact with said surface and extending substantially across the entire length of said body, each of said electrodes having a substantially triangular shape, the spacing between said electrodes being substantially constant and less than 5 mils, and a further electrode in low-resistance contact with said body.

11. A semi-conducting device comprising a semi-conducting body having a surface, a pair of electrodes, each consisting of a thin coherent layer of evaporated metal in electrical contact with said surface and extending substantially across the entire length of said body, said electrodes having a substantially uniform spacing between each other not exceeding 5 mils, said electrodes covering substantially said entire surface with the exception of the spacing therebetween, and a further electrode in low-resistance contact with said body.

12. A semi-conductor device comprising a semi-conducting body having a surface, said surface being provided with at least one shallow depression, an electrode extending across said surface and across said depression, said electrode consisting of a thin coherent layer of evaporated metal in rectifying contact with said body, a conducting contact element for said electrode, said element having a tip located in said depression and contacting said electrode, and a further electrode in low-resistance contact with said body.

13. A semi-conductor device comprising a semi-conducting body having a surface, said surface being provided with two shallow depressions, two electrodes extending across said surface and having a substantially parallel spacing therebetween, each of said electrodes extending across one of said depressions, said two electrodes being in rectifying contact with said body, two conducting elements, each having a tip located in one of said depressions and contacting its associated electrode, and a further electrode in low-resistance contact with said body.

14. A semi-conductor device comprising a semi-conducting body having a surface, said surface being provided with two shallow depressions, two electrodes extending across said surface and having a substantially parallel spacing therebetween not exceeding five mils, each of said electrodes extending across one of said depressions, said electrodes consisting each of a thin coherent layer of evaporated metal in rectifying contact with said body, a conducting contact element for each of said electrodes, each of said elements having a tip located in one of said depressions and contacting its associated electrode, and a further electrode in low-resistance contact with said body.

15. A semi-conductor device comprising a semi-conducting body having a surface, said surface being provided with two shallow depressions, two electrodes extending across said surface with a substantially constant distance therebetween, each of said electrodes passing across one of said depressions, said electrodes consisting each of a thin coherent layer of evaporated metal in rectifying contact with said body, a conducting contact element for each of said electrodes, each of said elements having a blunt tip located in one of said depressions and in electric contact with its associated electrode, and a further electrode in low-resistance contact with said body.

16. A semi-conducting device comprising a semi-conducting body having a surface, a thin conductive layer extending across said surface and in rectifying contact with said body, a first contact member consisting of a conductor having a tip contacting said layer only, and a second contact member consisting of a conductor having a sharp tip and located on said layer, said second contact member penetrating said layer to contact said body, thereby providing a point contact for said body.

17. A semi-conducting device comprising a semi-conducting body having a surface, a thin evaporated metallic layer extending across said surface and in rectifying contact with said body, a first contact member consisting of an elongated filamentary metallic element having a blunt tip contacting said layer, and a second contact member consisting of an elongated filamentary metallic element having a sharp tip and located on said layer, said second contact member penetrating said layer and providing a point contact for said body.

18. In a semi-conducting device of the type comprising a semi-conducting body having a surface, at least one electrode consisting of a conducting material evaporated onto said surface to form a thin coherent layer in rectifying contact with said body, and a metallic contact member for said electrode, said contact member consisting of a conductive filamentary member having a loop, said loop contacting said layer.

19. A semi-conductor device comprising a semi-conducting body, two conductors, means for insulating said body and said conductors from each other, said body and said conductors having each a substantially flat surface arranged in a common plane, and two electrodes for said body, each consisting of a thin coherent layer of evaporated metal in intimate rectifying contact with said body, said electrodes extending across the flat surface of said body and having a substantially uniform distance from each other not exceeding five mils, each of said electrodes further extending across one of said conductors to provide an electric contact therewith.

20. A semi-conductor device comprising a semi-conducting body, two conductors, an insulating member for supporting said body and said conductors in spaced relationship, said body, said conductors and said member having each a substantially flat surface arranged in a common plane, and two electrodes for said body, each consisting of a thin coherent layer of evaporated metal in intimate contact with said body, said electrodes extending across the flat surface of said body and having a substantially uniform spacing from each other not exceeding five mils, each of said electrodes further extending across one of said conductors to provide an electric contact therewith.

21. A semi-conductor device comprising a semi-conducting body, two conducting contact members, an insulating spacer provided between said body and each of said members, said body, said members and said spacers having each a substantially flat surface arranged in a common plane, and two electrodes for said body, each consisting of a thin coherent layer of evaporated metal in intimate contact with said body, said electrodes extending across the flat surface of said body and having a substantially uniform spacing from each other not exceeding five mils, each of said electrodes further extending across the flat surface of one of said conductors to provide an electric contact therewith.

HAROLD B. LAW.

REFERENCES CITED

The following references are of record in the file of this patent:

UNITED STATES PATENTS

| Number | Name | Date |
|---|---|---|
| 1,745,175 | Lillienfeld | Jan. 28, 1930 |
| 1,900,018 | Lillienfeld | Mar. 7, 1933 |
| 1,998,334 | Rupp | Apr. 16, 1935 |
| 2,163,393 | Brunke et al. | June 20, 1939 |
| 2,215,999 | Brunke | Sept. 24, 1940 |
| 2,239,770 | Becker et al. | Apr. 29, 1941 |
| 2,375,355 | Fahracus et al. | May 8, 1945 |
| 2,387,472 | Sontheimer | Oct. 23, 1945 |
| 2,438,892 | Becker | Apr. 6, 1948 |
| 2,476,323 | Rack | July 19, 1949 |
| 2,495,716 | Girard | Jan. 31, 1950 |
| 2,502,479 | Pearson | Apr. 4, 1950 |
| 2,505,633 | Whaley | Apr. 25, 1950 |
| 2,524,033 | Bardeen | Oct. 3, 1950 |